(12) United States Patent
Pieper et al.

(10) Patent No.: US 11,794,794 B2
(45) Date of Patent: Oct. 24, 2023

(54) RAIL ROAD TRACK LUBRICATION APPARATUS AND METHOD

(71) Applicant: RBL, Inc., Minneapolis, MN (US)

(72) Inventors: Robert Pieper, Minnetonka, MN (US); Justin Jeong Dailey, Crystal, MN (US)

(73) Assignee: RBL, INC., Minneapolis, MN (US)

( * ) Notice: Subject to any disclaimer, the term of this patent is extended or adjusted under 35 U.S.C. 154(b) by 104 days.

(21) Appl. No.: 16/579,367

(22) Filed: Sep. 23, 2019

(65) Prior Publication Data

US 2020/0017130 A1 Jan. 16, 2020

Related U.S. Application Data

(60) Continuation-in-part of application No. 15/418,166, filed on Jan. 27, 2017, now Pat. No. 10,421,469, which is a division of application No. 14/460,645, filed on Aug. 15, 2014, now Pat. No. 9,561,809, which is a continuation of application No. PCT/US2013/026360, filed on Feb. 15, 2013.

(Continued)

(51) Int. Cl.
*B61K 3/00* (2006.01)
*F16N 7/00* (2006.01)
*F16N 13/22* (2006.01)

(52) U.S. Cl.
CPC .......... *B61K 3/00* (2013.01); *F16N 7/00* (2013.01); *F16N 13/22* (2013.01); *F16N 2270/70* (2013.01)

(58) Field of Classification Search
CPC ....... B61K 3/00; F16H 19/003; F16H 19/005; F16H 19/006; F16H 19/0604; F16H 19/0622; F16H 19/0645
See application file for complete search history.

(56) References Cited

U.S. PATENT DOCUMENTS

| | | |
|---|---|---|
| 1,890,605 A | 12/1932 | Graham et al. |
| 2,183,727 A | 12/1939 | Stern |
| (Continued) | | |

FOREIGN PATENT DOCUMENTS

| | | |
|---|---|---|
| RU | 2094276 C1 | 10/1997 |
| RU | 80815 U1 | 2/2009 |
| RU | 2422313 C1 | 6/2011 |

OTHER PUBLICATIONS

Search Report and Written Opinion for PCT/US2013/026360, dated Jun. 6, 2013.

*Primary Examiner* — Minh Truong
(74) *Attorney, Agent, or Firm* — Westman, Champlin & Koehler, P.A.; Peter Sawicki; Amanda M. Prose

(57) ABSTRACT

An apparatus and system for applying lubricant to a rail road track having a control module, a housing, a lubricant distribution block, and a plurality of tubes for connecting the control module to the housing wherein the housing houses the lubricant distribution block. The control module is positionable in close proximity to the rail road track and the housing is positionable adjacent to and along a section of rail road track to be lubricated. The lubricant is stored in a vessel in the control module and pumped from the control module to a lubricant distribution nozzle connected to the housing and wherein sliding the lubricant distribution nozzle along the section of rail road track in a first direction distributes lubricant along the section of rail road track and then the block returns to a first position.

11 Claims, 6 Drawing Sheets

Related U.S. Application Data

(60) Provisional application No. 61/599,495, filed on Feb. 16, 2012.

(56) References Cited

U.S. PATENT DOCUMENTS

| | | | |
|---|---|---|---|
| 2,285,082 A | | 6/1942 | Bolt |
| 3,203,504 A | | 8/1965 | Bryant |
| 4,411,182 A | * | 10/1983 | Borzym ................ B23D 25/04 83/320 |
| 4,520,901 A | | 6/1985 | Borup et al. |
| 4,856,617 A | * | 8/1989 | Lounsberry, III ........ B61K 3/00 184/3.1 |
| 5,991,952 A | * | 11/1999 | Bintzler ................ B60S 3/006 104/307 |
| 6,419,072 B2 | * | 7/2002 | Kelley .................. B65G 35/00 198/346.1 |
| 6,578,669 B2 | | 6/2003 | Kast et al. |
| 6,631,786 B1 | | 10/2003 | Gunacker |
| 8,584,804 B2 | | 11/2013 | Holland |
| 9,016,436 B2 | | 4/2015 | Paluncic et al. |
| 9,561,809 B2 | | 2/2017 | Nelson et al. |
| 2002/0056592 A1 | | 5/2002 | Arens et al. |
| 2004/0050623 A1 | | 3/2004 | Urmson, Jr. et al. |
| 2009/0095570 A1 | | 4/2009 | Gunacker et al. |
| 2010/0300663 A1 | * | 12/2010 | Tso ........................ F25B 39/00 165/135 |
| 2011/0061973 A1 | | 3/2011 | Iden |

\* cited by examiner

RAIL ROAD TRACK LUBRICATION APPARATUS AND METHOD

CROSS-REFERENCE TO RELATED APPLICATION

The present application is a continuation-in-part of and claims priority of U.S. patent application Ser. No. 15/418,166, filed Jan. 27, 2017 which is a divisional of application Ser. No. 14/460,645, filed Aug. 15, 2014, which is a continuation of international patent application Serial No. PCT/US2013/026360, filed Feb. 15, 2013, which is based on and claims the benefit of U.S. provisional patent application Ser. No. 61/599,495, filed Feb. 16, 2012, the contents of which are hereby incorporated by reference in their entireties.

BACKGROUND OF THE INVENTION

This disclosure relates to the distribution of lubricant on the gauge face or inside of the rail of railroad tracks through the use of an automatic sensor driven system. The system allows for distribution of a greatly reduced amount of lubricant or grease to a targeted area.

Due to the enormous weight and centrifugal force involved with locomotives and rolling stock, a surprising amount of cohesion exists. This cohesion is between the wheel flange and the rail gauge face. Tiny flakes of steel from the rail and wheels are removed as a train's inside wheel contacts the rail. The only way to prevent such an occurrence is to apply lubrication to reduce cohesion.

Generally lubricant, or grease, is applied to the gauge face or inside of the rails at the point of wheel and rail contact. Currently, lubricant is applied by a wayside lubrication system that pumps lubricant to a distribution bar. This lubrication bar has many grooves from the top of the bar to a distribution port. This method piles large amounts of grease or lubricant toward the top of the rail. When the pile gets large enough the train wheels will contact the pile of grease or lubricant and spread the grease down the track. This method causes excessive throw off of grease or lubricant.

A problem occurs in lubricant application in that the excess amount of lubrication currently used coats an unnecessarily thick layer on the rail. This layer covers the tops of the rails and the lubricant is then inadvertently carried by the wheels to inclines or to other non-curved sections of the track. At areas where the tracks are inclined, friction is needed and the excess lubrication has an adverse effect on traction. In addition, the amount of lubricant currently required for minimum coverage is expensive.

This excess lubricant also covers the earthen area surrounding the rail section. As lubricant is applied now, a large amount is pumped in order to make sure the small area that needs lubrication is actually covered when a wheel comes in contact with it. This excess lubricant ends up not only coating the entire rail, but the ground surrounding it. While there may occasionally be pads laid down to absorb some of this excess lubricant, much of the excess seeps into the ground and migrates. This has negative impacts on the environment. Considering that major portions of railroad are set away from city areas, the lubricant can migrate into the environment near the tracks. Negative effects on the environment are compounded when the rails need to be repeatedly lubricated over time. Reducing the amount of lubricant needed will not only save money, it can reduce, if not eliminate any negative impact on the environment.

SUMMARY OF THE INVENTION

This disclosure relates to an apparatus for applying lubrication to a rail road track. The apparatus comprises a control module, a housing, a lubricant distribution block, and a plurality of tubes for connecting the control module to the housing. The housing houses the lubricant distribution block and the housing is connected to the control module by the plurality of tubes. The control module is positionable in close proximity to the rail road track and the housing is positionable adjacent to and along a section of rail road track to be lubricated.

This disclosure also relates to a method for applying lubricant to a section of rail road track. The method comprises storing lubricant in a vessel in a control module, the control module positioned proximate the section of rail road track and pumping lubricant from the control module to a lubricant distribution nozzle connected to a housing. The housing is positioned adjacent to and along the section of rail road track and sliding the lubricant distribution nozzle along the section of rail road track in a first direction will distribute lubricant along the section of rail road track.

DETAILED DESCRIPTION OF THE INVENTION

This invention relates to the application of lubrication to only a limited portion of rail where lubrication is actually needed. Large amounts of lubrication and money will be saved by applying a limited amount of lubricant at a more precise time of applying lubrication. Applying lubrication just before a wheel comes in contact with the rail will reduce the amount of lubricant needed. The lubricant will be carried by the wheels immediately after application rather than migrating to other portions of the rail, or the ground.

Figure 1:
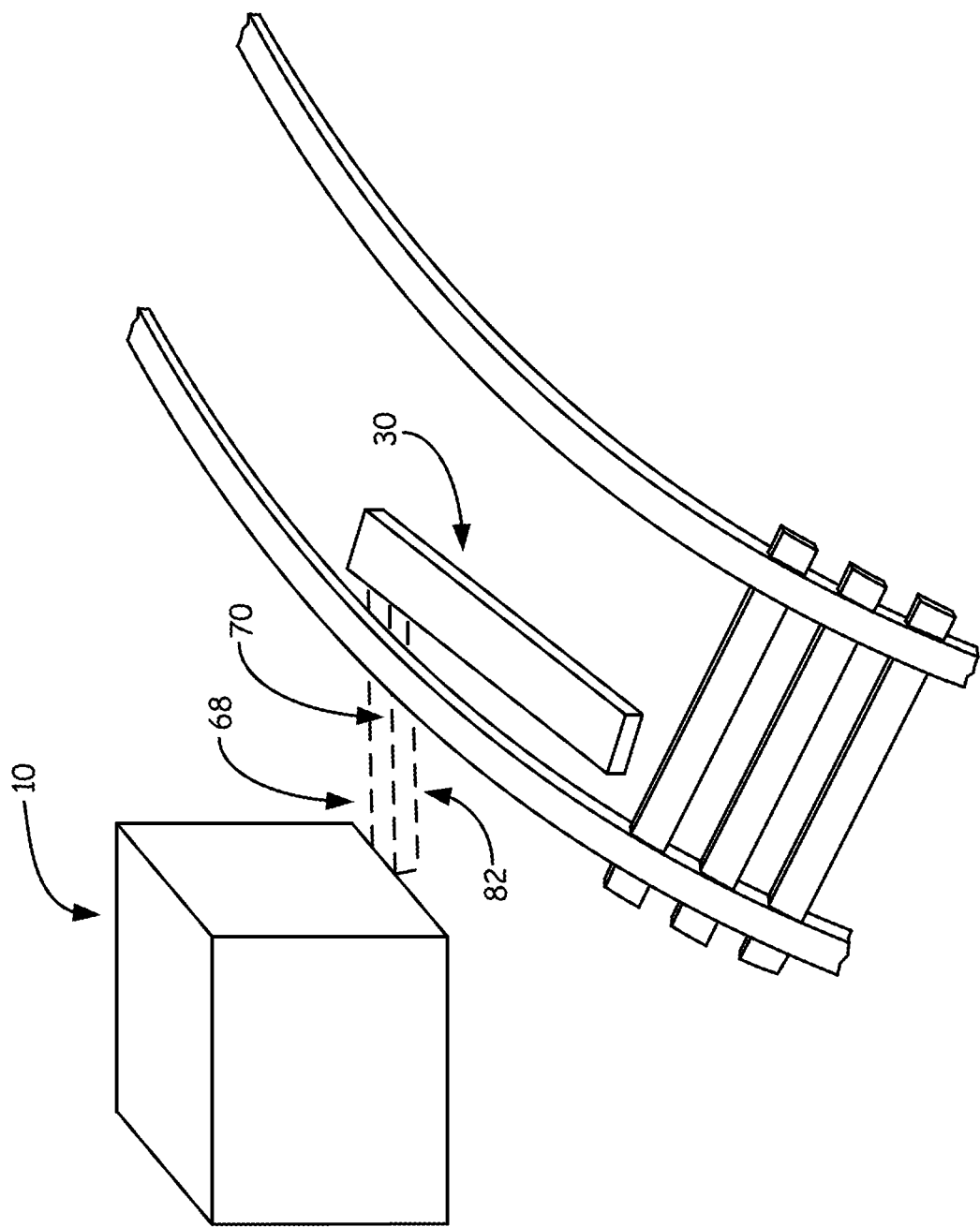
FIG. 1 is a perspective view of the present invention as in place for use.

As illustrated in FIG. 1, the present invention is generally comprised of three major components. The first is a control module 10. The control module 10 houses the major pressure, power and lubrication storage components of the invention. The control module 10 is stationed adjacent to a portion of railroad track. Second, the linear slide rack 30 houses the lubrication application components. The linear slide rack 30 is positioned in the track in close proximity to the surface in need of lubrication. The linear slide rack 30 is secured to the rails. Third, a series of steel tubes 68 and 70, for pressure and return lines, connects the control module 10 to the linear slide rack 30. The steel tubes 68 and 70 for pressure and return lines may be buried at a depth under the tracks, deep enough to allow for track and ballast maintenance. When connected, the lubrication process is initiated in the control module 10. The control module is equipped for manual initiation as well as automatic initiation of the lubrication process. The linear slide rack 30 contains the components that then carry out the lubrication distribution process.

Figure 2:
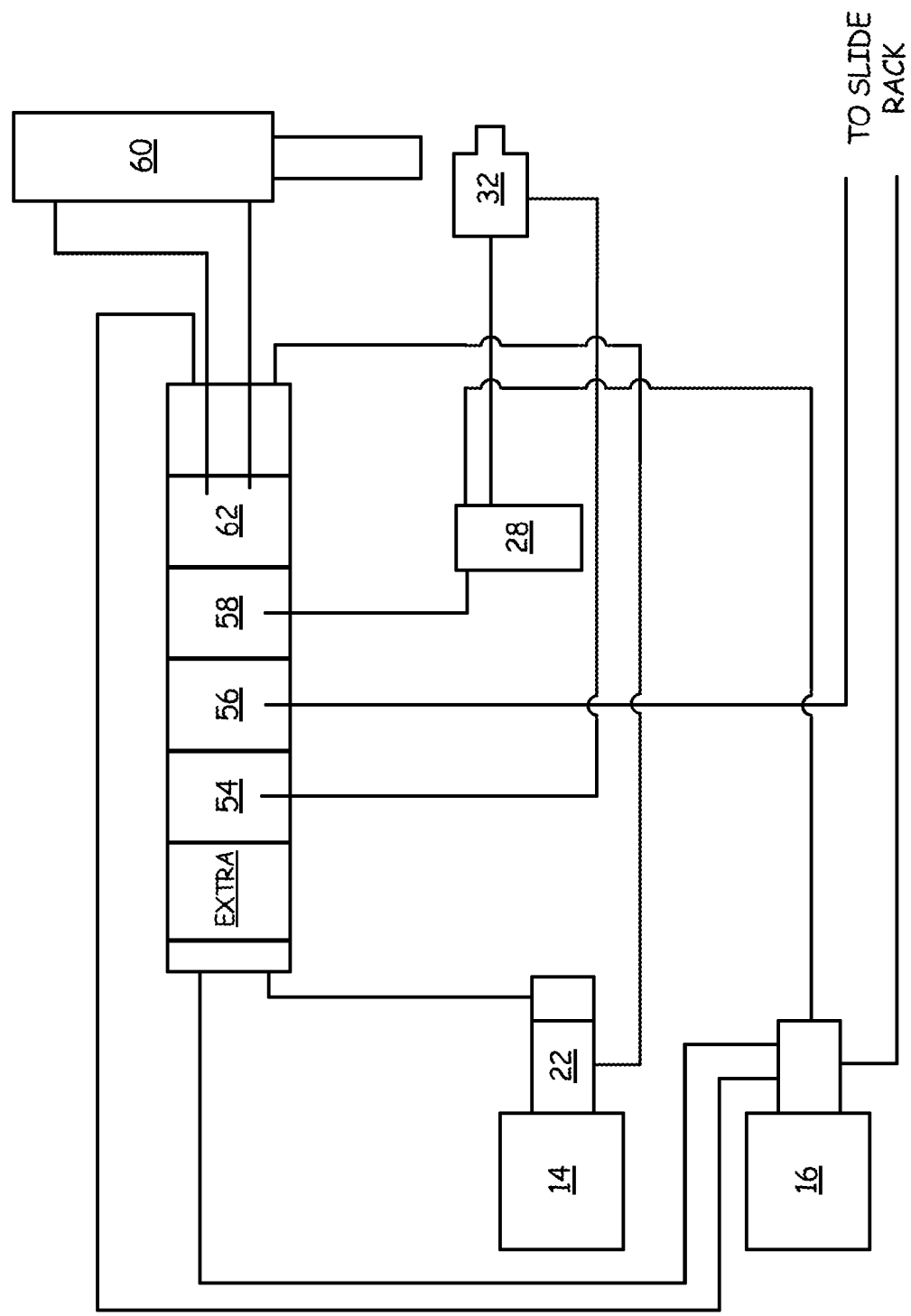
FIG. 2 is a schematic view of the invention.

In one embodiment, as illustrated in FIG. 1 is the control module housing 10. FIG. 2 is a schematic of the internal components of the housing 10. A control module housing 10 contains an electric motor, gas engine, LP engine, or diesel engine 14. A hydraulic reservoir 16 in the control module 12 provides storage for hydraulic oil. A dual section hydraulic pump 22 provides 23 GPM @ 2300 PSI for the large section and 3 GPM @ 1400 PSI for the small section. The module housing 10 includes a Programmable Logic Control that provides for the control of all of the electrical functions necessary. Illustrated in further detail in FIG. 2 is a hydraulic flow diagram of the components from the control module 10 to the application process in the linear side rack 30.

The electric motor or fueled engine 14 provides mechanical motion to drive a hydraulic pump 22. The hydraulic pump 22 provides pressure and volume. The hydraulic pump directs pressure to a hydraulic directional valve section 62 and accepts and directs return hydraulic pressure to a hydraulic reservoir 16. The hydraulic directional valve section 58 directs hydraulic pressure and flow to a hydraulic grease pump 28. The hydraulic directional valve also directs hydraulic pressure and flow to the hydraulic cylinder.

Figure 3:
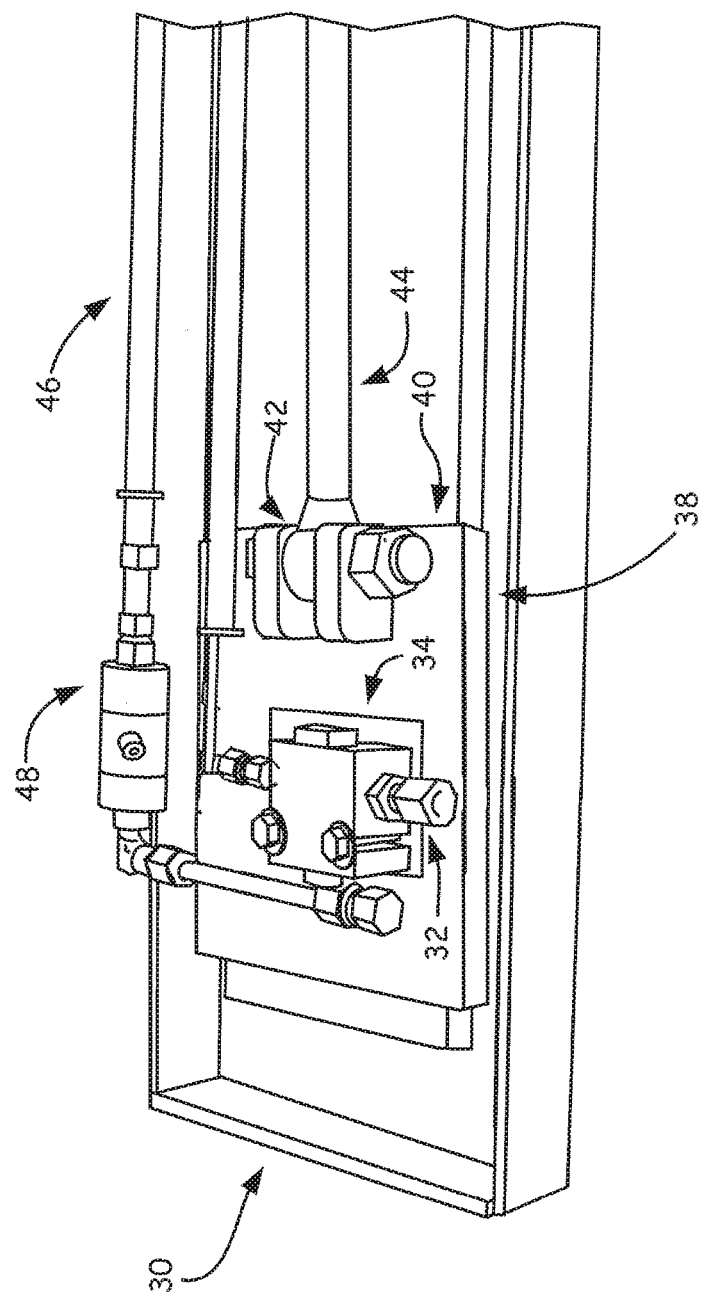
FIG. 3 is a perspective view of a process of the invention.
Figure 4:
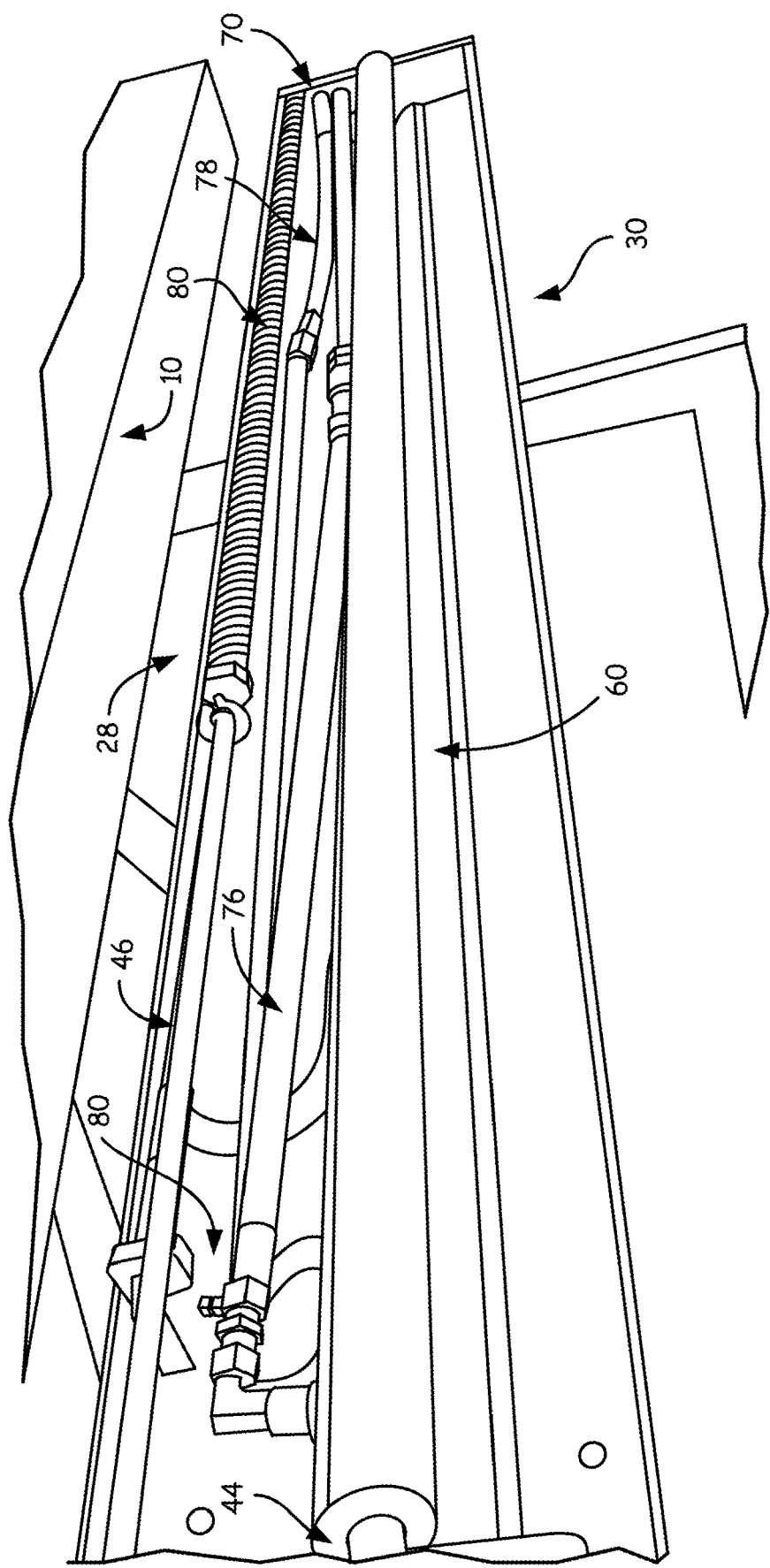
FIG. 4 is a perspective view of still a further component of the invention.

In further detail, as can be seen in FIGS. 3 and 4 the linear slide rack 30 is an enclosure made from suitable material, preferably aluminum. The linear side rack 30 has a removable cover for easy access to the inside components. The linear slide rack 30 is secured to the base of a portion of rail by mounting brackets or other suitable fasteners (not shown). The lubricant is distributed to the gauge face side of the railroad track by a lubricant distribution nozzle 32. The term "lubricant" as used herein means the type of lubricant used to effect rail adhesion and rail and wheel wear protection. Preferably, such lubricant has some rain resistance and ability to be "carried" down a rail by a wheel engaging the rail. The words "lubricant" and "grease" are used interchangeably herein. Suitable lubricants are made from a variety of materials and are available commercially as "rail lubricants".

The lubricant distribution nozzle 32 is attached to a lubricant distribution block 34 in which lubricant is delivered to the gauge face of the rail. The lubricant distribution block 34 is comprised of a small aluminum or other suitable metal box or riser to raise the nozzle 32 to the height of the intended lubrication surface. The lubricant distribution block 34 can be secured to a plate 38 on the lubrication surface facing side of the plate 38. The lubricant distribution block 34 extends upward or outward from a connection with the plate at a height equal to the inside or gauge face of the area targeted for lubricant distribution. The application nozzle 32 is oriented to face the intended distribution surface. In a further embodiment, the applicant nozzle 32 may extend toward the surface to be lubricated such that the nozzle 32 is rotatable from a retracted position inside the linear side rack 30 to an extended position facing the surface to be lubricated. The plate 38 with the application nozzle 32 together form the lubricant distribution block 34. The lubricant distribution block 34 is secured by a mounting attachment 42 or other suitable mechanism to an end of movement mechanism. That is, the application nozzle 32 may be hydraulically or electrically powered for linear movement in reciprocating directions. The lubricant distribution nozzle 32 may able be retractable with respect to the distribution block 34. For example, the nozzle 32 can be retracted into the housing of the distribution block 34 after application of lubricant and/or between applications of lubricant.

Where the lubricant distribution block is hydraulically powered, the block 34 is operably secured to a piston rod or hydraulic cylinder 44. In the embodiment where the block 34 is electrically powered, the block 34 is operably coupled to one or more rotatable belts for controlling movement of the block 34.

In the hydraulic system, as illustrated in FIGS. 3-4, the lubricant distribution block 34 is connected to a flexible hydraulic hose 46. A solenoid operated hydraulic valve section 54 provides hydraulic pilot pressure to shift the lubricant distribution block 34. The hydraulic activation valve section 58 provides hydraulic pressure to operate the hydraulic reciprocating lubrication pump 28. The lubrication pump 28 provides pressurized grease to the lubricant distribution block 34. The lubrication distribution block 34 provides pressurized grease for distribution to the rail.

As further illustrated in FIGS. 3 and 4, the piston rod or hydraulic cylinder 44 is connected to the lubricant distribution block 34. The piston rod or hydraulic cylinder for lubrication distribution 44 is also connected to the hydraulic cylinder barrel 60. The hydraulic cylinder barrel 60 lies along the length of the linear side rack. The hydraulic pressure reducing and directional valve section 62 provides bi-directional hydraulic pressure to operate the hydraulic cylinder barrel 60. The hydraulic cylinder barrel 60 provides the linear bi-directional motion for the lubricant distribution block 34. The hydraulic directional valve section 62 provides hydraulic pressure to operate the hydraulic cylinder 44. The hydraulic cylinder 44 moves the grease distribution block 34 into the application or stored position. The hydraulic valve section 56 provides a heating circuit that goes through entire conduit that goes out to the slide rack and back to the control module.

Figure 5:
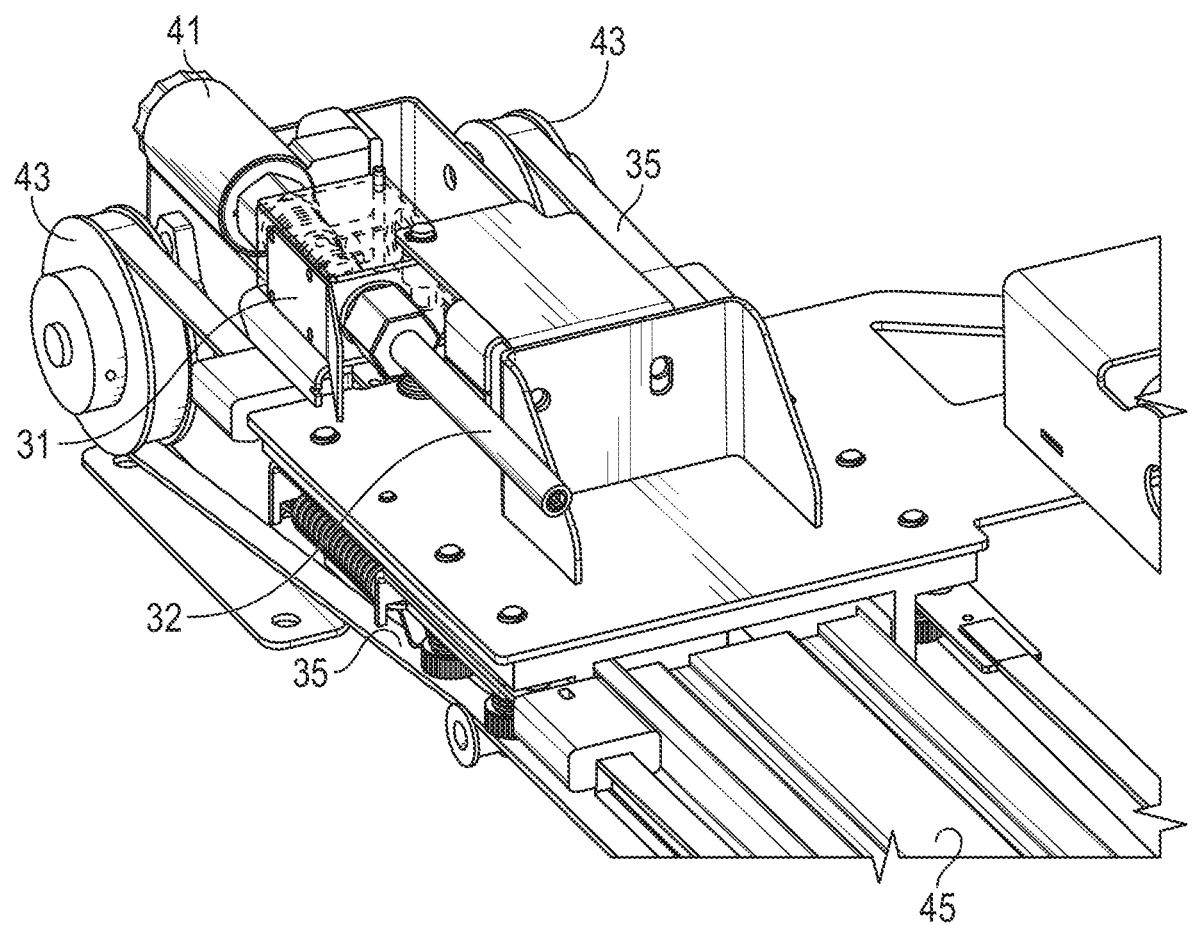
FIG. 5 is a perspective view of an embodiment of an electrically powered linear side rack.
Figure 6:
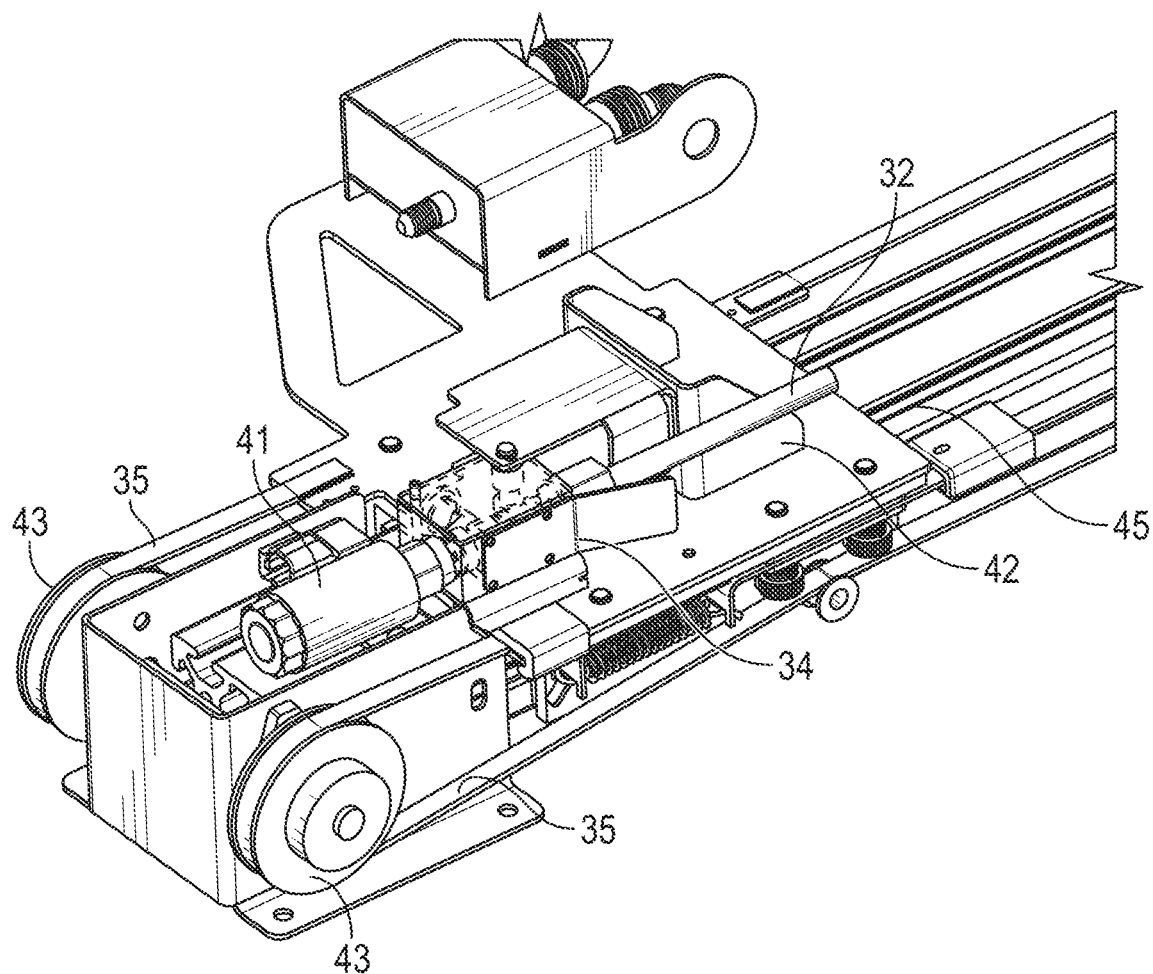
FIG. 6 is an additional perspective view of an embodiment of the electrically powered linear side rack.

In the electric system, as illustrated in FIGS. 5 and 6, the linear side rack 30 comprises an electrically actuated and powered lubricant distribution nozzle 32. The linear movement of the nozzle 32 is powered by a fuel injected LP engine (not shown) that provides the electrical power required to move the block 34 and an electric stepper motor may also be provided to rotate and/or move the nozzle 32, which can be retracted during sliding of the block 42 and extended when ejecting lubricant therefrom. The engine may be operably coupled directly to an alternator (not shown) that charges one or more batteries required for powering all operations from the linear side rack 30. In the embodiment illustrated, the alternator charges eight batteries (not shown), however more or fewer batteries can be incorporated into the system for power. Deep cycle batteries may be used to provide electrical power to run various components of the system including but not limited to a hot water pump, the lubrication or grease pump, application nozzle, application drive motor & belt assembly and the system communications. Further, an electric generator can be incorporated and operably coupled to the distribution block 34 or other control components in the system.

An embedded control board in the electrical system may be provided for controlling operation of the system components and lubrication processes in place of a programmable logic controller board or PLC.

The electrical system for movement of the lubricant distribution block 34 and nozzle 32 along the linear side rack 30 comprises a belt 35 driven distribution block 34. A redundant belt drive system includes two parallel systems using belts 35 and can be incorporated for effectuating the reciprocal sliding movement of the nozzle plate 42 and thus the lubricant distribution block 34 secured thereon, along the length of the liner side rack 30 as illustrated in FIGS. 5 and 6. The belts 35 are secured to plate 42 for moving the plate 42 and a belts 35 travel in a selected direction and the belts move along a track at least partially co-extending with the length of the side rack. The belts are wound around wheels 43 to provide a continuous loop for movement of the belts 35 in the corresponding direction. The belts 35 thus complete an electric system for movement of the nozzle plate 42 along track 45 which extends along the side rack. Tension of the belts is also adjustable.

An electrically controlled or pressure actuated solenoid 41 may also be incorporated into this system for opening and closing the valve of the application nozzle for controlling delivery of lubricant. In further detail, a nozzle bracket supports the nozzle valve assembly on the nozzle plate 42 and a torsion spring is used for rotating the nozzle shaft.

In either system, in further detail a flow line for each element, lubrication and pressure and return, connects the control module 10 and the linear side rack 30. The flow lines are comprised preferably of a steel tube 68 and 70 for each pressure function. Each steel hose is set externally underground, between the control module 10 and the linear slide rack 30. Each opposing end of each steel tube 68 and 70 is connected to an adapter. The opposing end of each adapter is then connected to a flexible hose. Hoses (not shown) are connected to the control module 10. Additional hoses 76 and 78 are connected to the linear slide rack 30 completing the flow line. Each connection of a flexible hose 76 and 78 to steel tube 68 and 70 is completed by a suitable adapter or fastener 80 to seal the connection from potential leaks. Each corresponding flexible hose 76 and 78 inside the linear slide rack 30 connects to the corresponding application component. An additional steel tube 82 is connected in the same fashion as described above to a flexible hose 46 in the linear slide rack 30 for lubrication flow.

The lubricant may also be heated for use and heating of the lubricant can be accomplished by increasing the hydraulic oil temperature in one embodiment and/or in the electric unit, the lubricant may be heated by way of providing a heated coolant source integral to the system. For example, the lubricant is enclosed within heated coolant lines to provide heated lubricant to the application nozzle. Moreover, the heated coolant may be directed to the section of rail at the application site to melt snow and/or ice in the vicinity. The lubricant line may be inside or within a water heating line so that the lubricant is moved through a heated pipe or tube system so that the lubricant can be heated to a suitable temperature for flowing from a storage tank to the distribution nozzle with warm or hot water.

A metal detecting proximity switch (not shown) or wheel sensor mounted adjacent the linear side rack 30 allows for automatic lubrication, reset and reverse sliding of the applicator slide 40 upon detection of the train via metal detection or other sensor. For example, lubrication commences approximately five (5) seconds after the last train wheel passes over the wheel sensor. The system then operates to apply a bead of lubrication at or near the gauge corner from the nozzle slidably mounted in the linear side rack 30. After lubrication is applied, the nozzle is automatically moved back to the starting position in a reciprocal direction to the direction of lubricant application, the initial position also referred to as a stand-by position may further include retracting the nozzle 34 into the linear side rack 30 for protection of the nozzle 34. The lubrication process can additionally be initiated manually on demand. Operation begins when a signal, whether automatic or on demand, is sent to the hydraulic pump 22 and/or electric motor 122 for movement of the application slide through the process described above and ejection of lubricant through the nozzle.

The process begins as a train approaches the area of track in need of lubrication. Automatic lubrication may be initiated by the metal detecting switch, which is triggered by a train's proximity to the linear side rack 30. Sliding extension of the lubrication application block 34 and application of the lubricant begins immediately prior to train wheel contact with the rails. The full lubrication application process of the selected area of track is carried out quickly. The process is initiated when the train is in close proximity to the portion of track and is complete immediately prior to train wheel contact. Further, on demand lubrication follows the same process, however an operator using a switch (not shown) in the control module 10 initiates lubrication. Lubrication can be bi-directional or set automatically for reset and reverse sliding to the initial position.

In a further embodiment the module 10 is equipped to send information to rail road personnel regarding maintenance and care of the module 10 as well as conditions of the system including lubricant levels, fuel level, operational condition and any other pertinent information regarding operation of the system. System updates may be sent from the control module to a mobile device or computer via text, voice, or e-mail message using cellular and/or satellite data connections.

The system described herein is configured to effectively lubricate up to eight (8) linear feet of rail per stroke using an adjustable amount of lubricant such that the lubricant used may be selected based on track condition and use or other factors including by not limited to those discussed herein. Is some embodiments the amount of lubricant used for a single application may be about only one (1) ounce of lubricant, however more or less lubricant can be delivered via the systems described herein.

The linear side rack 30 described herein may be mounted on top of one or more ties at or near an apex of a curve in the length of the track and on an inside of the high rail. The rack 30 can be secured to the base of the rail with one or more, and for example, three (3) rail brackets.

The system described herein does not contact any components of the train during normal operation of the system and the train and as such, the linear side rack can be placed at or near the apex of a curve in the train track for bi-directional lubrication of the track as described above.

Although the present invention has been described with reference to preferred embodiments, workers skilled in the art will recognize that changes may be made in form and detail without departing from the spirit and scope of the invention.

What is claimed is:

1. An apparatus for applying lubricant to a selected length of rail road track, the apparatus comprising:
   a control module;
   a housing stationarily positioned on top of one or more ties of track along the selected length of rail road track to be lubricated wherein the housing has a length extending along at least a portion of the selected length of rail road track;
   a lubricant distribution block slidable along the length of the stationary housing and the lubricant distribution block having a retractable distribution nozzle outwardly extendable from the housing, wherein the lubricant distribution block is electrically powered for linear movement in reciprocating directions along the length of the housing and wherein the retractable distribution nozzle is electrically powered for extension, retraction, rotation thereof or combinations thereof;

a redundant belt driven system comprising parallel belts secured to the lubricant distribution block where each belt travels in a selected direction along a track at least partially co-extending with a length of the housing, each belt wound around one or more wheels to provide a continuous loop for movement of each belt in a corresponding direction and for moving the lubricant distribution block in reciprocating directions along the length of the housing;

a plurality of tubes for connecting the control module to the lubricant distribution block as the control module is spaced apart from the housing wherein at least one tube connects a lubricant storage vessel to the lubricant distribution block and wherein the at least one tube is a heated tube for providing heated lubricant to the distribution nozzle.

2. The apparatus of claim 1 wherein the control module comprises pressure, power and lubrication storage components.

3. The apparatus of claim 1 further comprising the lubricant distribution nozzle, the nozzle attached to a lubricant distribution valve.

4. The apparatus of claim 3 wherein the lubricant distribution nozzle is positioned at approximately a same height as a gauge face side of the selected length of rail road track to be lubricated.

5. The apparatus of claim 1 and further comprising a wheel sensor positioned at or near the selected length of rail road track and configured to actuate the application of lubrication along the selected length of rail road track in response to sensing one or more wheels of an oncoming train.

6. The apparatus of claim 1 further comprising a mechanism in the control module for initiating lubrication manually.

7. The apparatus of claim 1 wherein the plurality of tubes provide lubricant pressure for ejection of the lubricant from the distribution nozzle as the lubricant distribution block moves in a first direction along the selected length of rail road track.

8. The apparatus of claim 7 wherein the lubricant distribution block automatically moves in a second direction along the selected length of rail road track after application of the lubricant to the selected length of rail road track to a stand-by position.

9. The apparatus of claim 8 wherein the lubricant distribution nozzle is retracted at least partially into the housing when in the stand-by position.

10. A system for remote lubrication of a section of rail road track, the system comprising:

a vessel for holding a supply of lubricant spaced apart from a housing and spaced apart from and positioned outside the section of rail road track;

the housing having a length coextending with and secured to the section of rail road track in a position on top of one or more ties or a base of the section of rail road track;

a lubricant distribution block positioned at least partially within the housing and slidable there along in reciprocal directions by way of a redundant belt driven system comprising parallel belts secured to the lubricant distribution block where each belt travels in a selected direction along a track at least partially co-extending with a length of the housing, each belt wound around one or more wheels to provide a continuous loop for movement of each belt in a corresponding direction and for moving the lubricant distribution block and having a distribution nozzle that is extendable and retractable with respect to the housing and is extendable in a direction of the section of rail road track for lubrication distribution on the section of rail road track wherein the lubricant distribution block is electrically powered for linear movement in reciprocating directions along the length of the housing and wherein the retractable distribution nozzle is electrically powered for extension, retraction, rotation thereof or combinations thereof;

at least one tube for delivering the lubricant from the vessel to the lubricant distribution block for lubrication distribution on the section of rail road track; and a heating system for the at least one tube for delivering the lubricant from vessel to the lubricant distribution block so that the nozzle is configured to eject lubricant heated to a flowable state in cold weather.

11. The system of claim 10 wherein a control module is connected to the vessel and comprises pressure and power components for delivering the lubrication from the vessel to the lubricant distribution block.

* * * * *